United States Patent

[11] 3,588,648

[72] Inventors T. O. Paine
Administrator of the National Aeronautics and Space Administration with respect to an invention of;
Edmund J. Bahm, Altadena, Calif.
[21] Appl. No. 840,308
[22] Filed July 9, 1969
[45] Patented June 28, 1971

[54] DC SERVO SYSTEM INCLUDING AN AC MOTOR
4 Claims, 2 Drawing Figs.
[52] U.S. Cl. ................................................ 318/227, 318/230
[51] Int. Cl. ................................................ H02p 5/40
[50] Field of Search ................................ 318/138, 227, 230, 231

[56] References Cited
UNITED STATES PATENTS
2,784,365  3/1957  Fenemore et al. ............ 318/231X
3,289,062  11/1966  Dannettell ..................... 318/227X
3,372,323  3/1968  Guyeska ......................... 318/230X FOREIGN PATENTS
745,840  3/1956  Great Britain ................. 318/231

Primary Examiner—Gene Z. Rubinson
Attorneys—G. T. McCoy, J. H. Warden and Paul McCaul ABSTRACT: A servosystem including an AC (Alternating Current) induction motor, designed for asynchronous operation, and a DC (Direct Current) to an AC inverter for driving the motor in response to a DC potential, a current regulator for controlling the potential and a closed loop circuit connected with the output of the motor for detecting deviation in motor speed, relative to a preselected speed, and a circuit for controlling the current regulator in response to detected deviations, whereby the slow speed characteristics of a DC motor and a smooth torque characteristic of an AC asynchronous motor are combined to provide a variable speed system having a capability for achieving and maintaining smooth torque outputs at selected speeds, in the absence of speed reduction gear trains and the like.

EDMUND J. BAHM
INVENTOR

ATTORNEYS

3,588,648

DC SERVO SYSTEM INCLUDING AN AC MOTOR

ORIGIN OF INVENTION

The invention described herein was made in the performance of work under NASA contract and is subject to the provisions of Section 305 of the National Aeronautics and Space Act of 1958, Public Law 85—568 (72 Stat. 435; 42 U.S.C. 2457).

BACKGROUND OF THE INVENTION

1. Field of the Invention

This invention relates to servosystems and more particularly to a closed loop servosystem having both a smooth torque output and a variable speed capability.

2. Description of the Prior Art

Systems employed in driving various types of electrically operated subsystems, such as, for example, analog computer modules and tape recorders for space craft and the like, often require the use of numerous speed reduction devices, such as multistage gear trains, in order to drive the subsystem at preselected rates. Normally, existing speed reduction systems tend to experience malfunction under severe operative conditions, such as those encountered in celestial space probes. However, systems used in controlling intelligence recording and transmitting functions aboard space craft must be both durable and dependable, in order to avoid redundancy while yet assuring successful completion of selected missions. Therefore, various attempts have been made to increase the efficiency of servosystems.

Where electrical circuitry has been employed for achieving the desired speed reduction, various difficulties have been encountered. For example, as is well known, the torque characteristics of a synchronous motor operating at asynchronous speeds significantly differs from its characteristics at synchronous speeds. Furthermore, speed control for motors designed for asynchronous operation has, as a practical matter, proven extremely difficult. Since a servo control motor normally is not permitted to operate at a constant and synchronous speeds, difficulty in acquiring a smooth output is encountered in attempting to drive synchronous motors at asynchronous speeds. In attempting to employ motors designed for asynchronous operation, complexity in circuitry to achieve variable slow-speed output has not proven totally satisfactory. Consequently, the techniques frequently employed in driving various devices aboard space craft require the use of various types of motors and complex speed reduction gear trains for achieving speed reduction capability accompanied by smooth torque characteristics. This, in turn, often results in system malfunction, which cannot be tolerated.

OBJECTS AND SUMMARY OF THE INVENTION

The present invention overcomes many of the aforementioned difficulties through the use of an asynchronous motor, such as a self-starting AC induction motor, for example, electrically coupled through an inverter circuit to a DC source of electrical potential, the output of which is controlled through a current limiter so that the density of the revolving field of magnetic flux, hereinafter called the amplitude of the magnetic field, established within the induction motor selectively is variable for achieving speed control, while the resulting output torque remains independent of shaft position. Hence, motor operation at a variable low speed with minimal speed ripple is provided.

An object of the invention is to provide an improved servosystem.

Another object is to provide an improved closed loop servosystem having a variable speed capability.

Another object is to provide a closed loop servosystem having a variable speed capability employing an AC induction motor energized by a DC source of electrical potential.

Another object is to provide an improved and simplified servosystem which employs an inductance motor designed for asynchronous speeds and driven by a source of DC potential through an inverter circuit, and a current regulator for controlling the amplitude of the revolving magnetic field, and a detection circuit for detecting the output speed of the motor and providing a controlling input to the current regulator for overcoming deviation from selected speeds.

These together with other objects and advantages will become more readily apparent by reference to the following description and claims in light of the accompanying drawing.

DESCRIPTION OF THE PREFERRED EMBODIMENT

Figure 1:
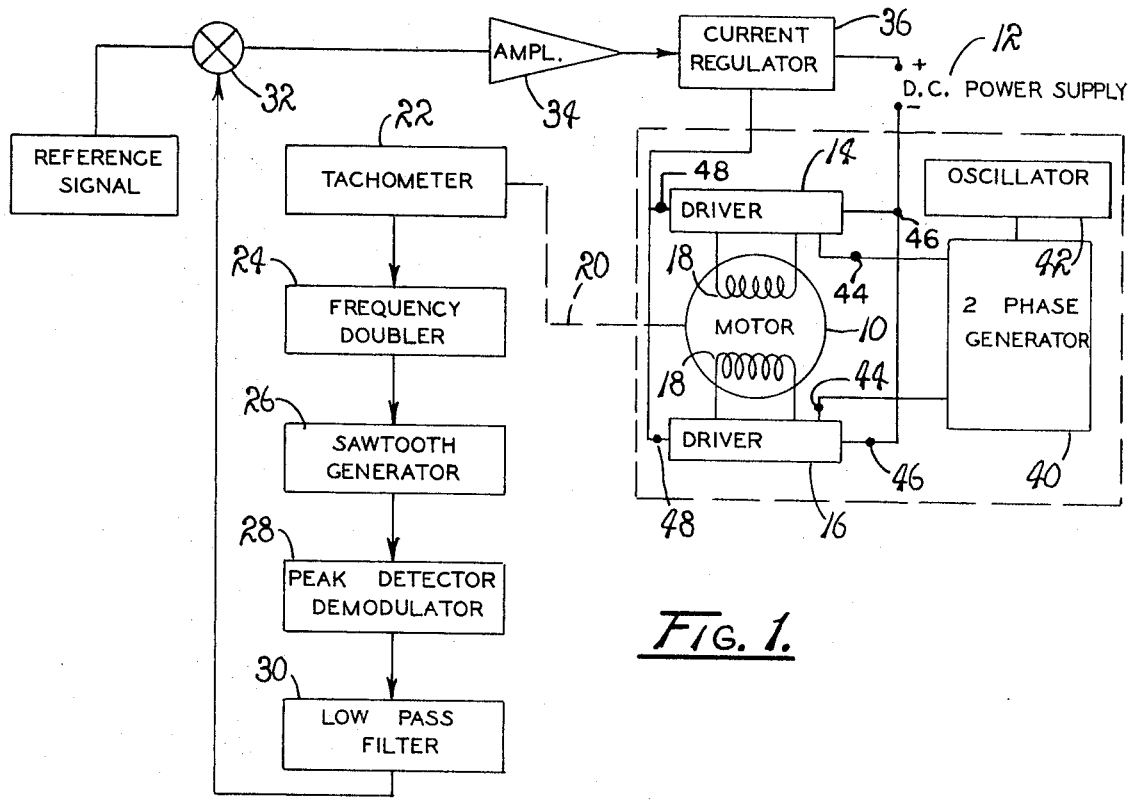
FIG. 1 is a diagrammatic view, in block form, of the servosystem embodying the principles of the present invention.

As illustrated in FIG. 1, the servosystem embodying the principles of the present invention is essentially a closed loop servosystem having a capability for detecting operative speeds and correcting speed deviations.

The system includes a motor 10, powered by a DC source of electrical potential 12. The motor 10 is of any one of a number of convenient types of induction motors currently available. As a practical matter, the motor 10 is a self-starting AC motor having the capability of developing high torque at asynchronous speeds. Normally, such motors are of a polyphase induction type and include a stator, having primary windings, and a rotor having secondary windings. The rotor is coupled with an output shaft, not shown, which provides the required output torque. Normally, the energy supplied is delivered to the stator and is introduced into the rotor by induction. Because of the encountered slippage, high torque, at low speed, is a common characteristic of induction motors. However, such motors normally are coupled with an AC source of potential for driving the motor by establishing a rotating magnetic field developed as the primary windings are energized by an alternating current.

In order to employ the DC source of potential 12, there is provided a pair of driver circuits 14 and 16 coupled in the stator of the motor 10. Each driver circuit includes an inductance coil 18, forming a pair of the primary windings of the motor, which functions to develop a rotating magnetic field in a manner consistent with the design of inductance motors.

The motor 10 is provided with an output shaft, not shown, which serves to drive convenient mechanical linkages. The output shaft is connected through a suitable mechanical linkage 20 to a tachometer 22. The tachometer 22 is of any suitable design and is so coupled with the shaft as to provide any one of the various types of electrical signal outputs common to such devices. However, as presently employed, the tachometer is such as to provide an output signal in a sinusoidal form.

At the output of the tachometer 22, there is electrically connected a frequency doubler 24, which also is of any suitable design. The function of the frequency doubler is to provide a narrow positive pulse at every zero crossing of the tachometer's sinusoidal output signal. These narrow pulses are then directed through suitable circuit connections to a sawtooth generator circuit 26. The generator circuit 26 is of a type which provides an output in the form of a series of constant slope ramp voltage signals, each of which is generated in response to an input of a positive pulse provided by the frequency doubler. Due to the constant slope, the time factor between the pulses causes the amplitude of the ramp voltage of each ramp voltage signal to be inversely proportional to the tachometer frequency.

The peaks of the successive signals provided by the generator 26 are detected by a peak detection modulator 28, which senses the peaks of the successive sawtooth signals and provides an output signal having a voltage level inversely proportional to the speed of the motor 10. This relationship can be appreciated when it is understood that the greater the speed of the motor 10, as detected at its shaft by the tachometer 22, the smaller the amplitude of the output from the sawtooth generator, due to the decrease in the periods of the pulses provided by the frequency doubler 24.

A low pass filter 30 is connected at the output of the peak detection modulator 28 which provides a constant level output signal. This signal serves as a servo feedback signal from which an error signal indicative of speed deviation may be acquired. The error signal is acquired by comparing the feedback signal with a constant level reference signal. In practice, the reference signal is a DC signal which is delivered by a battery or other source of DC potential. In order to achieve the desired comparison of the feedback signal with the supplied reference signal, a comparator circuit 32 of a convenient design, such as, for example, a difference circuit, is provided. Since comparator circuits are well known, a detailed description thereof is omitted. However, it is to be understood that the feedback signal and the reference signal are delivered to the comparator circuit at a predetermined polarity, whereupon an error signal having a polarity and an amplitude proportional to the difference between the input signal and the feedback signal is provided. The error signal desired from the comparator 32 is delivered to an amplifier circuit 34, whereat the signal is amplified to a working level and delivered to a current regulator 36.

The current regulator 36 provides a variable voltage output signal for varying the amplitude of the current delivered from the power source 12 to the coils 18 of the motor 10. For the sake of simplicity, the current regulator 36 is illustrated as a variable resistance coupled in series between the power source 12 and the motor 10 so that a current flowing between the motor and the power source also flows through the regulator circuit.

In practice, the current regulator 36 generates a voltage drop inversely proportional to the amplitude of the error signal so that the rate of flow of the current delivered by the source 12 is proportional to the error signal. Therefore, it should be understood that the greater error signal delivered from the comparator 32 the smaller will be the voltage drop and, consequently, the greater will be the current flow through the inductance coils 18 of the motor. As the flow is increased, the amplitude of the magnetic fields or flux density developed by the coil 18 is increased. Conversely, the smaller the error signal the greater will be the voltage drop in the current regulator 36, hence, the amplitude of the current delivered to the coil 18 is altered to a lesser extent, whereupon the amplitude of the magnetic field is altered to a lesser degree.

Therefore, simply by controlling the amplitude of the amperage, or rate of current flow delivered by the DC source 12, the amplitude of the magnetic field developed by the inductance coils 18 is controlled. Consequently, the speed of the motor 10 is directly related to the amplitude of the revolving magnetic field independently of the position of its rotor.

The driver circuits 14 and 16, which establish the revolving magnetic field of the stator, are pulsed at a selected frequency by a two-phase generator 40. The two-phase generator 40 is of a design which is capable of delivering a series of positive output signals to each of the driver circuits 14 and 16. The circuits are pulsed in a manner such that current through the coils has a selected phase difference established therebetween. Since two-phase generators of this type are well known, a detailed description is omitted in the interest of brevity. However, as illustrated, the generator 40 is pulsed by a 1,000 Hertz oscillator 42, also of a well-known design.

The output from the generator 40 is delivered through terminals 44 to the driver circuits 14 and 16. Since the driver circuits 14 and 16 are of similar design, a detailed description of only one of the driver circuits and its function is deemed sufficient for providing a complete understanding of the invention. Each of the driver circuits is basically a saturating power amplifier circuit adapted to direct current in alternate directions.

Figure 2:
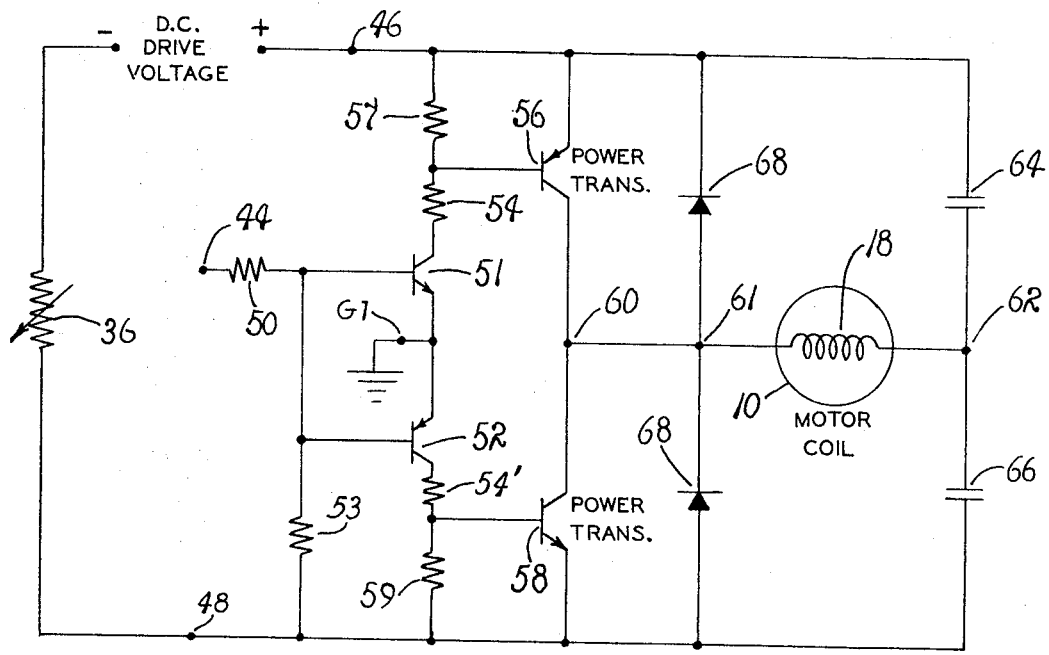
FIG. 2 is a diagrammatic view illustrating a solid state switching circuit employed for switching the driver circuits of FIG. 1.

As illustrated in FIG. 2, each of the driver circuits includes an input terminal 46 connecting the circuit with the positive pole of the DC source of potential 12, as well as a terminal 48 for connecting the circuit with the negative pole of the source through the current regulator 36.

The input terminal 44 is connected through a current limiting resistance 50 to the base of one of a pair of switching transistors 51 and 52. As illustrated, the transistor 51 is an NPN transistor while the transistor 52 is a PNP transistor, each having its emitter connected to a first common terminal $G_1$. A biasing resistance 53 is connected between the base of the transistor 52 and the negative terminal of the source of potential 12 for biasing this transistor to a conducting mode. The collector of the transistor 51 is connected through a current limiting resistance 54 to the base of a PNP transistor 56. The base of this transistor 56 is connected to the positive terminal of the source 12, through a biasing transistor 57 which imposes a forward bias on the transistor. The output signals derived from the transistor 51 serve to switch the power transistor 56 to a conducting mode when a switching signal is applied to the base of the transistor 51 from the generator 40. The collector of the transistor 56, in turn, is connected to the inductance coil 18 through terminals 60 and 61 while its emitter is connected with the positive terminal of the source 12. The collector of the PNP transistor 52 is coupled through a current limiting resistance 54' to the base of the NPN power transistor 58 and serves to switch the power transistor to a reverse bias state when a positive pulse is applied to the terminal 44.

The emitter of the transistor 58 is connected with the negative pole of the source 12 while it is forward biased through a convenient biasing resistance network including the resistor 59. The collector of the transistor 58 is, in turn, coupled with the inductance coil 18 through terminals 60 and 61.

The opposite side of the coil 18 is connected to a second "common" terminal $G_2$ through a junction terminal 62. The terminal 62 also serves to connect a capacitor network, including a pair of relatively large capacitors 64 and 66 coupled to the coil 18. In effect, the terminals $G_1$ and $G_2$ are electrically interconnected and maintained at a common potential so that as the potential at $G_1$ is varied, the potential at $G_2$ also is varied. The capacitors 64 and 66 are, in turn, connected with the terminals 46 and 48, respectively. Consequently, the capacitors operatively are charged and discharged by a current delivered through the inductance coil 18 in opposing directions, as determined by the state of conduction of the transistors 51 and 52. If the capacitors 64 and 66 are excessively large they tend to absorb the current delivered through the coil 18 and substantially "fix" the potential of the "common" relative to the output of the source 12. However, in order to improve performance, the relationship of the capacitance of the capacitors 64 and 66 is such that a sinusoidal output signal is delivered therefrom through the coil 18.

In practice, it has been found convenient to provide a pair of current blocking diodes 68 which are so connected with the terminals 61 that as the magnetic field is developed and collapsed in the coil 18, the transistors 56 and 58 do not see the normally occurring voltage spike.

Each of the driver circuits 14 functions in the following manner. In the absence of a positive input signal at the terminal 44, the transistor 51 is reverse biased, through the resistance 53, while the power transistor 58 is reverse biased, through the resistance 59 and the power transistor 56 is forward biased through the resistance 57. Initially, terminals $G_1$ and $G_2$ are at a near zero potential, due to the effect of the capacitance of the capacitors 64 and 66 simultaneously acting on the terminal 62. Consequently, a flow of current is established through the coil 18 in a first direction, between the terminals 46 and 62. As a positive input pulse, acquired from the generator 40, is applied at the terminal 44, the transistor 51 is switched "on" so that a flow of current through the transistor is established to the terminal $G_1$ and to the emitter of the transistor 52. At this time, the positive potential of the electrically interconnected terminals $G_1$ and $G_2$ is caused to increase, whereupon the flow between terminals 46 and 62 is interrupted. As the positive potential at the emitter of the transistor 52 is increased, the transistor 52 is switched "on" so that a positive signal now is applied to the base of the power transistor 58, through the resistance 54', for thus causing the power transistor to conduct, whereupon a reverse current flow is established in a second direction through the coil 18, between the terminals 62 and 48, for thus reversing the direction of the current flow through the coil, whereby the coil is caused to function as though it were electrically coupled with a source of alternating current. Therefore, it should be understood that the output signal from the generator 40 comprises a series of positive pulses which alternately effect a switching of the transistors 51 and 52, as well as 56 and 58 for thereby reversing the direction of current flow through the coil 18 of the driver circuit for causing the coil to function as if an AC current was being applied thereto.

OPERATION

It is believed that in view of the foregoing description, the operation of the device will be readily understood and it will be briefly reviewed at this point. With the circuit of FIG. 1 connected in a manner heretofore described, a reference signal is delivered at a preselected value to the comparator circuit 32. From the comparator circuit there is provided an error signal which is delivered to the amplifier 34. The amplifier 34 now delivers a working signal to the current regulator 36. The current regulator 36 serves to dictate the amperage applied to the coils 18 through the power transistors 56 and 58 while the phase generator 40 provides a series of positive pulses at a preselected rate determined by the oscillator 42. As the generator 40 provides a series of pulses to the input terminal 44 of the driver circuits 14 and 16, the power transistors 56 and 58 are continuously and alternately switched for achieving a charging and a discharging of the capacitors 64 and 66 through the inductance coil 18 so that an alternating current is developed between terminals 61 and 62 of the driver circuits. As the alternating current is delivered, a rotating magnetic field is developed in the stator so that a rate of rotation is imposed on the rotor of the motor 10. This rate of rotation is detected by the tachometer 22 which provides a sinusoidal signal to the frequency doubler 24. The frequency doubler 24 serves to provide a plurality of narrow positive pulses which are utilized by the sawtooth generator 26 for establishing a series of sawtooth signals having peaks determined by the spacing of the pulses. The output of the sawtooth generator is then delivered to the peak detector demodulator 28 which provides a signal proportional to the peak voltage of the signals delivered by the sawtooth generator. This output is then delivered through a low pass filter 30, as a feedback signal, to the comparator circuit 32. The reference signal and the feedback signal are then compared in a comparator with the difference therebetween being provided as an error signal from the comparator 32 to the amplifier 34. The current regulator 36 is then driven in a manner such that the voltage drop occurring thereat is inversely proportional to the amplitude of the error signal so that the current delivered to the inductance coils 18 is varied proportionally to the amplitude of the error signal. By controlling the amplitude of the current delivered through the inductance coils 18, the amplitude of the magnetic field developed thereabout is accurately controlled. Through controlling the amplitude of the magnetic field, the speed of the motor is accurately controlled.

In view of the foregoing, it is to be understood that the described embodiment of the instant invention provides a system wherein very low speeds of relatively small motors may be achieved with little speed ripple for accommodating motor operation over a wide speed range.

Although the invention has been herein shown and described in what is conceived to be the most practical and preferred embodiment, it is recognized that departures may be made therefrom within the scope of the invention.

We claim:
1. A servosystem comprising:
A. an inductance motor including therein a wound stator and a rotor;
B. a source of DC voltage;
C. a plurality of sequentially energized driver circuits, each including therein an inductance coil arranged within the primary windings of the stator of said motor and electrically coupled with said source, and switch means alternately reversing directions of flow for a current flow established from said source through the coil for thereby establishing about the coil an alternating magnetic field having a flux density proportional to the amplitude of the flow of current, whereby a revolving magnetic field is established within the primary windings of the motor and a rate of rotation responsively is imparted to said rotor as said driver circuits sequentially are energized;
D. a reference signal input circuit continuously providing an output comprising a constant level reference signal of a given polarity and amplitude;
E. means for detecting the rate of rotation imparted to said rotor and providing a rate output signal having an amplitude indicative of said rate of rotation;
F. a comparator circuit electrically coupled with said reference signal input circuit and said means for detecting the rate of rotation of said rotor adapted to provide an output error signal having a voltage amplitude proportional to the instantaneous difference between that of the reference signal and the provided rate output signal; and
G. means including a current regulator electrically coupled with the comparator circuit, and electrically connected between said source of DC voltage and said plurality of driver circuits through which the current flow is established for introducing a voltage drop inversely proportional to the voltage amplitude of the error signal, whereby the amplitude of current flow established through the coils of said plurality of driver circuits is varied in accordance with the amplitude of the error signal for thereby varying the flux density of the rotating magnetic field.

2. The servosystem according to claim 1 wherein the switch means includes a solid-state switching circuit including solid-state switching devices for reversing the direction of current flow through the driver circuit at a frequency dictated by a given input switching signal.

3. The servosystem according to claim 2 further comprising a constant frequency, two-phase generator operatively connected with each of said driver circuits adapted to provide an alternating, constant frequency input switching signal for controlling said solid-state circuit.

4. A closed loop servosystem comprising:
A. a self-starting induction motor having a stator, a rotor, and a rotatable output shaft connected with said rotor;
B. a source of DC electrical energy;
C. a first and second sequentially energizable driver circuit electrically coupled with the stator of said motor and said source of electrical energy, each driver circuit including;
  i. an inductance coil arranged within said stator,
  i.i. a pair of power transistors comprising a PNP and an NPN transistor, the collectors of the pair of transistors being connected at the same side of the inductance coil, while the emitters thereof are connected to opposite poles of the source of DC electrical energy, and
  i.i.i. biasing means biasing said pair of transistors in a manner such that the transistors alternately are caused to conduct for thereby delivering current in opposite directions through the inductance coil;
D. a two-phase, constant frequency generator operatively coupled with said driver circuits adapted to provide a series of switching signals to each pair of power transistors for thereby establishing a selected rate of change for the direction of the current flowing through the coils of the driver circuits, whereby a revolving magnetic field is established within said stator having a flux density determined by the amplitude of the current delivered through the coils;

E. a current regulator electrically coupled within each of said driver circuits adapted to dictate the amplitude of the current delivered through the coil of the driver circuit;

F. a rate output circuit including a tachometer coupled with the output of the motor adapted to detect the instantaneous rate of rotation of the shaft and provide an electrical signal at a voltage level indicative of the detected instantaneous rate;

G. a reference signal circuit selectively adjustable to provide a constant level reference signal at a voltage level indicative of a selected rate of rotation for the motor;

H. a comparator circuit operatively coupled with the rate output circuit and the reference signal circuit adapted to compare the relative voltage levels thereof to provide an error signal having a voltage level indicative of the instantaneous difference in voltage levels established between said reference signal and said rate signal; and I. means for delivering the error signal to the current regulator of each of said driver circuits for driving the current regulator in a manner such that the amplitude of the current delivered through the coil of each driver circuit is proportional to the provided error signal, whereby the rate of rotation of the motor is varied in response to changes in the error signal.